(12) United States Patent
Sun et al.

(10) Patent No.: US 12,027,358 B2
(45) Date of Patent: Jul. 2, 2024

(54) MASS SPECTROMETRY ANALYSIS METHOD AND MASS SPECTROMETRY SYSTEM

(71) Applicant: Shimadzu Corporation, Kyoto (JP)

(72) Inventors: Wenjian Sun, Shanghai (CN); Ran Qiu, Shanghai (CN); Xiaoqiang Zhang, Shanghai (CN)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 17/216,988

(22) Filed: Mar. 30, 2021

(65) Prior Publication Data

US 2021/0313161 A1 Oct. 7, 2021

(30) Foreign Application Priority Data

Apr. 2, 2020 (CN) .......................... 202010256750.0

(51) Int. Cl.
*H01J 49/00* (2006.01)
*G01N 30/72* (2006.01)

(52) U.S. Cl.
CPC ...... *H01J 49/0072* (2013.01); *G01N 30/7206* (2013.01); *G01N 30/7233* (2013.01); *H01J 49/0036* (2013.01)

(58) Field of Classification Search
CPC .. H01J 49/0072; H01J 49/0036; H01J 49/004; G01N 30/7206; G01N 30/7233; G01N 27/623; G01N 27/447; G01N 30/72; G01N 27/622; G01N 27/624; G01N 30/02; G01N 30/06; G01N 30/14; G01N 2030/067

(Continued)

(56) References Cited

U.S. PATENT DOCUMENTS 6,630,662 B1 * 10/2003 Loboda ................ G01N 27/623
250/281
7,199,362 B2 * 4/2007 Rockwood ........... G01N 27/622
250/286

(Continued)

OTHER PUBLICATIONS

Office Action for Chinese patent application No. 202010256750.0, dated Jul. 26, 2023.

(Continued)

*Primary Examiner* — Michael Maskell
(74) *Attorney, Agent, or Firm* — Muir Patent Law, PLLC

(57) ABSTRACT

The invention provides a mass spectrometry analysis method and a mass spectrometry system, including: a first sample separation step, separating a sample by a first sample separation device to obtain first isolates; a second sample separation step, introducing ionized first isolates into a second sample separation device for further separation based on a difference in ion mobility to obtain second isolates; and a mass spectrometry analysis step, performing mass spectrometry detection at least on daughter ions obtained from dissociation of the second isolates; in the second sample separation step, the second sample separation device operates in a filter mode, and screens out and releases ions having ion mobility within a specified range from received second isolates. The mass spectrometry analysis method can improve the dynamic range of mass spectrometry analysis.

32 Claims, 5 Drawing Sheets

(58) Field of Classification Search
USPC .......................................... 250/281, 282, 288
See application file for complete search history.

(56) References Cited

U.S. PATENT DOCUMENTS

| | | | |
|---|---|---|---|
| 8,809,769 B2* | 8/2014 | Park | H01J 49/004 |
| | | | 250/281 |
| 10,020,174 B2* | 7/2018 | Zhang | G01N 30/72 |
| 2015/0276676 A1* | 10/2015 | Jiang | G01N 27/623 |
| | | | 250/282 |
| 2016/0005581 A1* | 1/2016 | Graichen | H01J 49/0031 |
| | | | 250/288 |
| 2020/0013599 A1 | 1/2020 | Toyama et al. | |

OTHER PUBLICATIONS

Office Action dated Jan. 2, 2024, for corresponding application No. CN 202010256750.0.
Winter, Daniel L., Marc R. Wilkins, and William A. Donald. "Differential ion mobility-mass spectrometry for detailed analysis of the proteome." Trends in Biotechnology vol. 37, No. 2 (2019): pp. 198-213.

* cited by examiner

MASS SPECTROMETRY ANALYSIS METHOD AND MASS SPECTROMETRY SYSTEM

CROSS-REFERENCE TO RELATED PATENT APPLICATION

This application claims priority to and the benefit of Chinese Patent Application Serial No. 202010256750.0, filed Apr. 2, 2020, which is incorporated herein in its entirety by reference.

TECHNICAL FIELD

The invention relates to the field of mass spectrometry, in particular to a mass spectrometry analysis method and a mass spectrometry system.

BACKGROUND

Currently, high resolution tandem mass spectrometry has become an important analytical instrument for omics analysis (including metabonomics, proteomics, and the like). At present, the tandem analysis method combined with chromatogram is one of the conventional methods for omics analysis.

In order to further improve the sensitivity and increase dimensions of orthogonal separation, more and more manufacturers are coupling ion mobility-based separation devices to a chromatographic-tandem mass spectrometry device. Since the ion mobility-based separation devices, such as an ion mobility spectrometry instrument (e.g., a time scale of an analysis cycle is 10 ms), and the chromatogram (e.g., a time scale of an analysis cycle is 1200 s), mass spectrum (e.g., TOF-MS is 100 μs) work at different magnitudes of frequencies, these devices can connect with each other for tandem analysis.

For example, diaPASEF by Bruker is added with a dual trapped ion mobility spectrometry (TIMS) analyzer between the chromatogram and Q-TOF. In the dual TIMS analyzer, a first TIMS analyzer is used to trap and store ions, and a second TIMS analyzer separates the ions according to the ion mobility. By reducing an electric field intensity of the second TIMS, the ions will be sequentially released in pulses from an outlet of the second TIMS analyzer in the order of ion mobility. Since the ion mobility spectrometer adopts the above operating mode, ions will be enriched in storage space during a binding-storage process. Therefore, as shown in FIG. 1, high-abundance ions tend to exceed a detection limit of a detector due to enrichment in an accumulation region, which saturates the detector and destroys response linearity of the detector and causes a peak intensity in an actual spectrum to be lower than a theoretical value; and some low-abundance ions are discharged from the accumulation region due to the space charge effect and cannot be detected, which causes low-abundance components to be lost in the actual spectrum, and the occurrence of the above phenomena will cause the problem of narrowing a dynamic range of detection.

SUMMARY

In view of the above problems, the present invention provides a mass spectrometry analysis method. When a dimension of orthogonal separation increases, enrichment of ions to be detected during a transport process can be reduced or even avoided, thereby alleviating a saturation problem of high-abundance ions or loss of low-abundance ions, improving quantitative accuracy of high-abundance ions, reducing a detection limit of low-abundance ions under interference, and improving a dynamic range of mass spectrometry analysis.

The mass spectrometry analysis method includes the following steps of: a first sample separation step, separating a sample by a first sample separation device to obtain first isolates; a second sample separation step, introducing ionized first isolates into a second sample separation device for further separation to obtain second isolates; and a mass spectrometry analysis step, performing mass spectrometry detection at least on daughter ions obtained from dissociation of the second isolates; in the second sample separation step, the second sample separation device operates in a filter mode, and screens out and releases ions having ion mobility within a specified range from received second isolates.

In the second sample separation step, the second sample separation device works in the filter mode, which allowing ions that meet a preset condition to pass through while removing ions that do not meet the preset condition and are difficult to continue to be transported to a lower device. Specifically, in the mass spectrometry analysis method provided by the present invention, the preset condition is a range of ion mobility, for example, an ion mobility range of ions or a range of ion-gas collision cross-sectional area.

In some technical solutions of the present invention, the second sample separation device working in the filter mode can select ions with ion mobility values falling in the specified range to pass through the second sample separation device and transport to the lower device, while ions that do not fall within the specified range will be removed. In an operating cycle of the second sample separation device, the specified range can be flexibly set as required. For example, different specified ranges can be selected at different time periods in a cycle to enable ions in different ion mobility range to pass through in a specified order.

Through the above method, since the second sample separation device works in the filter mode, in which the filter mode cannot only meet the requirements of data independent acquisition for a data acquisition form, that is, selection of range in a windowed form, but also enables movement of the ions selected for release on a drift path to remain relatively continuous. In other words, no or less stagnation or slow movement exists in some areas of the drift path to store the ions. The cancellation or reduction of storage behavior can facilitate keeping concentration of high-abundance ions below a saturation limit of the detector, and enable low-abundance ions to be stably transported to a lower-level device, thereby effectively improving the quantitative accuracy of the high-abundance ions, detection sensitivity of the low-abundance ions and a dynamic range of detection.

In an alternative technical solution of the present invention, in the second sample separation step, when the second sample separation device selects ions having ion mobility within a specified range for release, the ions within the specified range are kept moving on a specified path from an ion inlet to an ion outlet. The ions are kept moving on the specified path from the ion inlet to the ion outlet, so that the ions can maintain a certain moving speed and the continuity of movement inside the ion mobility spectrometer, thereby reducing accumulation of ion beams in some areas inside the ion mobility spectrometer, and ensuring ease of keeping the concentration of high-abundance ions below the detection limit of the detector while ensuring transporting low-abundance ions to the detector more stably without being discharged or lost easily due to the space charge effect generated by the accumulation in the transmission process.

In an alternative technical solution of the present invention, in the second sample separation step, the second sample separation device continuously selects ions in different windows within a full ion mobility range to release to a lower level, and scans the full ion mobility range in the specified order. Through the above method, the ions of different windows within the full ion mobility range are successively released to the lower level in an end-to-end manner, thereby improving utilization efficiency of the ion beams during an ion release process and increasing duty cycle of the instrument.

In an alternative technical solution of the present invention, the mass spectrometry analysis step further includes mass spectrometry analysis for the parent ions. Mass spectrometry measurement is performed on both the parent ions and the daughter ions, and MS1/MS2 mass spectrometry data can be obtained, so that a corresponding relationship between the parent ions and the daughter ions can be determined at least partly with the help of a matching relationship between MS1 mass spectrometry data and MS2 mass spectrometry data.

In an alternative technical solution of the present invention, the mass spectrometry analysis step further includes collecting the mass spectrometry data of the parent ions and the mass spectrometry data of the daughter ions by using an ion trap mass analyzer, in which the collection of the mass spectrometry data of the daughter ions is repeated several times in succession. The ion trap mass analyzer can integrate various functions such as transmission, mass selection, dissociation of ions, and the like, and utilizes a simple device to dissociate ions with a specific mass-to-charge ratio or in a mass-to-charge ratio range from received or stored ions, so that the ions can be performed multiple tandem analyses in a time dimension to provide more detail information for structural analysis of compounds.

In an alternative technical solution of the present invention, in the mass spectrometry analysis step, a first mass analyzer and a second mass analyzer are provided in the mass spectrometer, and at least one ion dissociation device is provided between the first mass analyzer and the second mass analyzer. In the mass spectrometer, the first mass analyzer is used to select ions within the specified mass-to-charge ratio range to pass into the ion dissociation device; the second mass analyzer is used to collect the mass spectrometry data of daughter ions generated by the ion dissociation device.

In an alternative technical solution of the present invention, the mass-to-charge ratio range is defined as a full mass-to-charge ratio range or one of a plurality of mass-to-charge ratio windows divided by the full mass-to-charge ratio range.

In an alternative technical solution of the present invention, each mass-to-charge ratio window includes at least 5 consecutive numbers of mass-to-charge ratios.

In an alternative technical solution of the present invention, the width of the plurality of mass-to-charge ratio windows is variable or consistent within the full mass-to-charge ratio range.

In an alternative technical solution of the present invention, the first mass analyzer synchronously completes one scanning within the full mass-to-charge ratio range when the second sample separation device completes one ion release in which the ion mobility is within a specified range. Synchronous running of the second sample separation device and the mass spectrometry can improve the utilization efficiency of the ion beams and the duty cycle of the instrument.

In an alternative technical solution of the present invention, in the mass spectrometry analysis step, one or more parent ions are selected according to preset conditions and spectrum information of parent ions, and are dissociated into daughter ions for mass spectrometry analysis. Provided by the present invention and capable of improving dynamic range of the device, the technical solution also can be applied to a scenario in which a number of parent ions that satisfy one or more preset conditions, such as the highest abundance, by using a data dependent acquisition (DDA) method are dissociated, and has good universality.

The present invention also provides a mass spectrometry system including: a first sample separation device for separating a sample to obtain first isolates; a second sample separation device for further separating the first isolates in an ionized state by using differences in ion mobility to obtain second isolates; a mass spectrometer for performing mass spectrometry detection at least for the daughter ions obtained from the dissociation of the second isolates, in which the second sample separation device works in the filter mode, and screens out and releases ions having the ion mobility within a specified range from received second isolates.

In an alternative technical solution of the present invention, when the second sample separation device selects ions having ion mobility within a specified range, the ions within the specified range are kept moving in a specified direction on a specified path from the ion inlet to the ion outlet.

In an alternative technical solution of the present invention, the first sample separation device is selected from one or more multiplex or combination devices among a liquid chromatographic instrument, a high performance liquid chromatographic instrument, an ultra high performance liquid chromatographic instrument, a gas chromatographic instrument, a supercritical fluid chromatographic instrument, a capillary electrophoresis instrument, and a gel permeation chromatographic instrument. The mass spectrometry system provided by the technical solution can be adapted to the combination of a plurality of separation devices and an ion mobility separation device, and has good universality and industrial applicability.

In an alternative technical solution of the present invention, the mass spectrometry device includes an ion trap mass analyzer for collecting parent-ion mass spectrometry data and daughter-ion mass spectrometry data.

In an alternative technical solution of the present invention, the mass spectrometry device includes a first mass analyzer, an ion dissociation device and a second mass analyzer that are sequentially connected in series. The first mass analyzer is used for selecting ions in the specified mass-to-charge ratio range to pass into the ion dissociated device; and the second mass analyzer is used for collecting mass spectrometry data of daughter ions generated by the ion dissociation device.

In an alternative technical solution of the present invention, the first mass analyzer is a quadrupole mass analyzer, a time-of-flight mass analyzer, or a magnetic sector mass analyzer.

In an alternative technical solution of the present invention, the ion dissociation device is one or a combination among a collision-induced dissociation device, an ultraviolet-induced dissociation device, an electron capture dissociation device, an electron transfer dissociation device, and a surface-induced dissociation device.

In an alternative technical solution of the present invention, the second mass analyzer is a quadrupole mass analyzer, a time-of-flight mass analyzer, a magnetic sector mass analyzer, or a Fourier transform mass analyzer.

Figure 1:
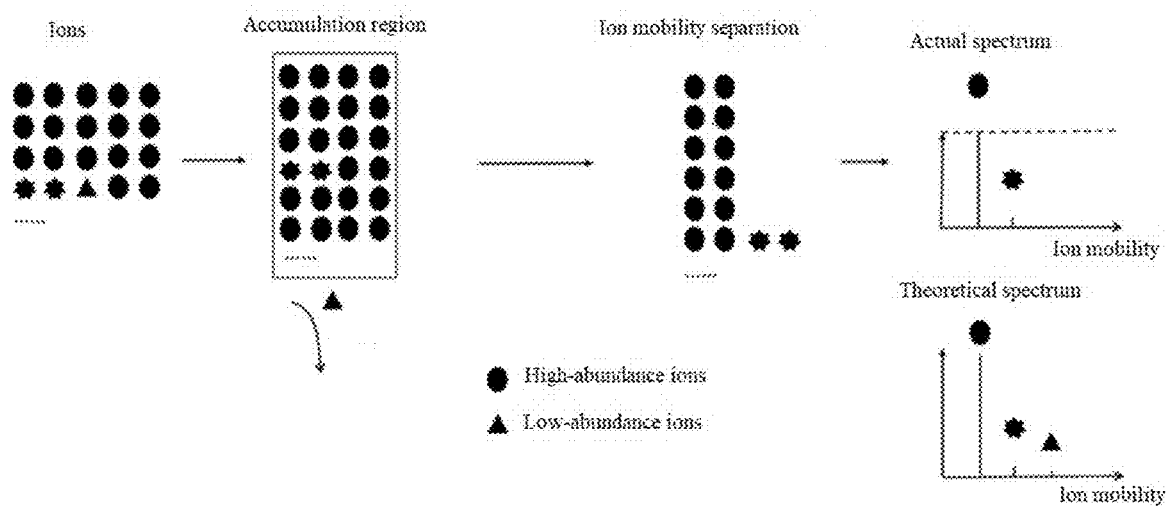
FIG. 1 is a schematic diagram illustrating a principle of limited dynamic range in a technical solution of the prior art.

Reference Numerals: 1—chromatogram-ion mobility spectrum-mass spectrum system; 100—chromatographic instrument; 102—ionization device; A104—ion mobility spectrometer; 104a, 104b, 104c, 104d—electrode array; 104in—ion inlet; 104out—ion outlet; PATH—specified path; E1, E2—direct current electric field; G1, G2—gas flow; 105—mass spectrometer; 106—first mass analyzer; 108—ion dissociation device; 110—second mass analyzer; 112—processor.

DETAILED DESCRIPTIONS

The technical solution in embodiments of the present invention will be fully described hereinafter with reference to the accompanying drawings in the embodiments of the present invention. Obviously, the described embodiments are merely part of the embodiments of the present invention rather than all embodiments. Based on the embodiments in the present invention, all other embodiments obtained by a person skilled in the art without creative work shall fall within the scope of the present invention.

Figure 2:
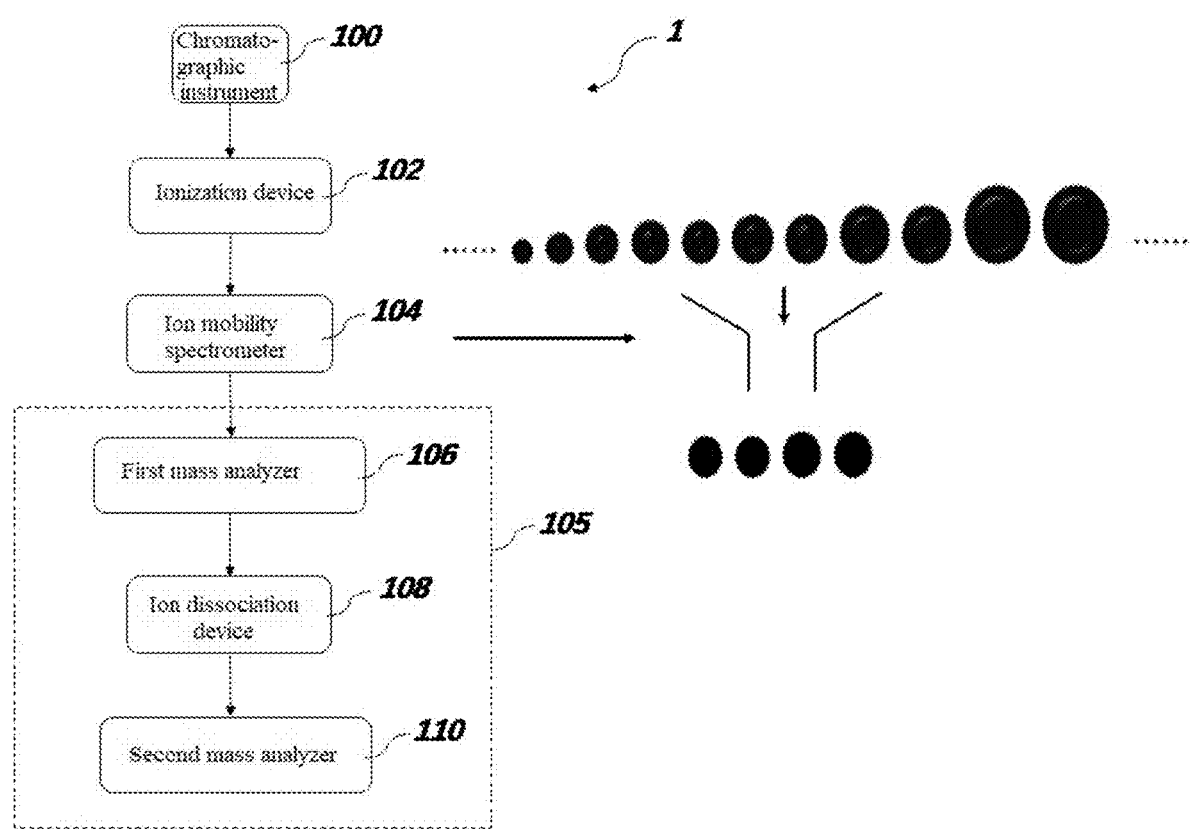
FIG. 2 is a schematic diagram of modules in a mass spectrometry system according to an embodiment in the present invention.

As shown in FIG. 2, the present embodiment provides a chromatogram-ion mobility spectrum-mass spectrum system 1 (LC-IMS-MS), which mainly includes three device modules of chromatographic instrument 100, ion mobility spectrometer 104, and mass spectrometer 105.

The chromatographic instrument 100 is a liquid chromatographic instrument, i.e., a first sample separation device in the present embodiment for performing chromatographic separation on a liquid mixture, in which the chromatographic data obtained by chromatographic separation is first characteristic data associated with retention time (separation time), such as chromatographic spectrum data. Effluents of the chromatographic instrument, i.e., first isolates, are ionized by an ionization device 102 and sent to an ion mobility spectrometer 104.

The ion mobility spectrometer 104, i.e., a second sample separation device in the present embodiment, can perform secondary separation on components in the sample that are difficult to be effectively separated according to the retention time by using differences in ion mobility. Data obtained by the ion mobility spectrometer 104 is second characteristic data associated with ion mobility, such as ion mobility spectrum data.

Next, second isolates obtained by the secondary separation by the ion mobility spectrometer 104 are passed into the mass spectrometer 105. The mass spectrometer 105 can dissociate the second isolates, perform mass spectrometry analysis on the dissociated daughter ions, and obtain multiple mass spectra to form a mass spectrometry data set.

In some embodiments, the mass spectrometry data set can be deconvoluted according to the chromatographic data of the chromatographic instrument 100 and the ion mobility spectrum data of the ion mobility spectrometer 104 in the analysis process of the mass spectrometry data set. Since the daughter ions from the same parent ion have the same retention time and ion mobility, and have similar or the same peak shapes, chromatographic data and ion mobility spectrum data can effectively assist a classification task of daughter ions for classifying daughter ions from the same parent ion into one category. In other embodiments, the analysis of the mass spectrometry data set may also be performed by searching and comparison with a chromatogram in the database. Specifically, the mass spectrometry analysis method provided by the present embodiment can be adapted to a mass spectrometry system for data dependent acquisition or data independent acquisition.

Specifically, in the present embodiment, the chromatographic instrument 100, the ion mobility spectrometer 104, and the mass spectrometer 105 are provided sequentially along a transmission flow path of samples or sample ions, the chromatographic instrument 100 is provided upstream of the transmission flow path of samples or sample ions, the mass spectrometer 105 is provided downstream of the transmission flow path of samples or sample ions, and the ion mobility spectrometer 104 is provided between the chromatographic instrument 100 and the mass spectrometer 105.

An ionization device 102 is provided between the chromatographic instrument 100 and the ion mobility spectrometer 104. The effluents (first isolates) that has been performed primary separation by the chromatographic instrument 100 are ionized into ion beams that are transmitted by an ion optical device and sent into the ion mobility spectrometer 104 for secondary separation. The chromatographic instrument 100 and the ion mobility spectrometer 104 have different operating cycles or operating frequencies. The general analysis duration of separation for liquid mixture by the chromatographic instrument 100 is typically several minutes or hours, and the operation duration of a single cycle of the ion mobility spectrometer 104 is in a range of milliseconds to seconds. Therefore, the ion mobility spectrometer 104 can be utilized to increase separation of the second dimension before the ions are sent into the mass spectrometer 105, and perform effective separation on the components that are difficult to be effectively separated by the chromatographic instrument 100 according to the retention time.

It should be noted that the depiction of the positional relationship between the chromatographic instrument 100, the ion mobility spectrometer 104, and the mass spectrometer 105 in FIG. 2 is merely illustrative, and does not strictly limit the positions of the chromatographic instrument 100, the ion mobility spectrometer 104, and the mass spectrometer 105 in mass spectrometry systems. In other embodiments, the chromatographic instrument 100, the ion mobility spectrometer 104, and the mass spectrometer 105 may also be configured in an integrated manner, and the relative positional relationship between each other among the three may also be reversed. For example, although in the present embodiment, the sample ions are separated by the ion mobility spectrometer 104, and then passed into the mass spectrometer 105 for ion mass selection, dissociation, detection, or the like, this position selection or coordination is only illustrative. In some other embodiments, a first mass analyzer 106 of the mass spectrometer 105 may be used first for ion mass selection, and then the ions after mass selection are transported to the ion mobility spectrometer 104 at a lower level.

In the present embodiment, an ordinary liquid chromatographic instrument is selected as a first-level separation device by way of example for introduction. In other embodiments, the first-level separation device can also be a high performance liquid chromatographic instrument, an ultra high performance liquid chromatographic instrument or a gas chromatographic instrument. The liquid chromatographic instrument can be based on size exclusion chromatography, ion exchange chromatography or pH gradient chromatography. In addition, the first-level separation device may further include a capillary electrophoresis separation device; a capillary electrophoresis chromatographic separation device; a hard ceramic-based multilayer microfluidic separation device; a gel permeation chromatographic separation device; or a supercritical fluid chromatographic separation device, etc.

Ionization Device

The first isolates obtained through chromatographic separation are passed into the ionization device 102 for ionization, and the ionization device 102 includes an ion source selected from the group consisting of: (i) electrospray ionization ("ESI") ion source; (ii) atmospheric pressure photoionization ("APPI") ion source; (iii) atmospheric pressure chemical ionization ("APCI") ion source; (iv) matrix assisted laser desorption ionization ("MALDI") ion source; (v) laser desorption ionization ("LDI") ion source; (vi) atmospheric pressure ionization ("API") ion source; (vii) desorption ionization on silicon ("DIOS") ion source; (viii) electron impact ("EI") ion source; (ix) chemical ionization ("CI") ion source; (x) field ionization ("FI") ion source; (xi) field desorption ("FD") ion source; (xii) inductively coupled plasma ("ICP") ion source; (xiii) fast atom bombardment ("FAB") ion source; (xiv) liquid secondary ion mass spectrometry ("LSIMS") ion source; (xv) desorption electrospray ionization ("DESI") ion source; (xvi) Nickel-63 radioactive ion source; (xvii) atmospheric matrix-assisted laser desorption ionization ion source; (xviii) thermospray ion source; (xix) atmospheric sampling glow discharge ionization ("ASGDI") ion source; (xx) glow discharge ("GD") ion source; (xxi) impactor ion source; (xxii) direct analysis in real time ("DART") ion source; (xxiii) laser spray ionization ("LSI") ion source; (xxiv) sonic-spray ionization ("SSI") ion source; (xxv) matrix-assisted inlet ionization ("MAII") ion source; (xxvi) solvent assisted inlet ionization ("SAII") ion source; (xxvii) Penning ionization ion source; (xxviii) laser ablation electrospray ionization ("LAESI") ion source; and (xxix) He plasma (HePl) ion source. More preferably, a desorption electrospray ionization ("DESI") ion source, a matrix-assisted laser desorption ionization ("MALDI") ion source, a direct analysis in real time ("DART") ion source, and a laser ablation electrospray ionization ("LAESI") ion source, or the like, under chamber pressure or a real-time ion source are used.

It should be noted that, although in the present embodiment, the ionization device 102 is configured between the first-level separation device (chromatographic instrument 100) and the second-level separation device (ion mobility spectrometer 104) before the mass spectrometer 105, arrangement positions and manners are merely illustrative. In other embodiments, the relative positions of the ionization device 102 and the first-level separation device and the second-level separation device can also be adjusted according to actual needs, e.g., when the separation of the first-level separation device needs to be performed for the ion sample, the ionization device 102 can also be configured before the first-level separation device.

Ion Mobility Spectrum

The ion mobility spectrometer 104 can use a drift tube ion mobility spectrometry (DTIMS), a field asymmetric waveform ion mobility spectrometry (FAIMS, also known as differential mobility spectrometry, DMS), a travelling-wave ion mobility spectrometry (TW-TMS), an aspiration ion mobility spectrometry (AIMS), a tandem-trapped ion mobility spectrometry (TTMS), a U-shape ion mobility analyzer (UMA) or any other ion mobility spectrometers in suitable forms. Preferably, the ion mobility spectrometer 104 that can operate in a filter mode is used, such as a differential ion mobility spectrometer. A device structure capable of achieving an ion mobility filter function may be, for example, solutions disclosed in U.S. Pat. No. 7,718,960B2, U.S. Pat. No. 9,281,170B2, Chinese patent No. 109003876A and Chinese patent No. 109003877A.

Continuing to refer to FIG. 2, in this embodiment, a U-shaped ion mobility spectrometer is taken as an example of the ion mobility spectrometer 104 for illustration. The ion mobility spectrometer 104 is operated in an ion mobility filter mode to screen out ions having ion mobility within the specified range from the second isolates for releasing to the lower level.

Herein, "screen out and releases ions having ion mobility within the specified range" does not mean that screening conditions set by a device, a control system, or a user must be metered in the form of ion mobility. In some embodiments, a device, a control system, or a user may also set the screening conditions as other conditions related to ion mobility, such as setting the screening conditions to be metered in collision cross-sectional area (CCS) or mobility rate (v) to screen out and releases ions having a collision cross-sectional area or a mobility rate within a specified range. The above screening conditions should be considered as equivalent embodiments of the technical solution of the present invention as long as the screening conditions can be converted into screening conditions of ion mobility via deformation, derivation and the like of physical formulas.

In this embodiment, the ion mobility spectrometer 104 operating in the ion mobility filter mode screens out and releases ions having ion mobility within the specified range. Specifically, the release method is as follows. A full ion mobility range (or a preset or user-set ion mobility range) is divided into a plurality of different ion mobility windows, and each operating cycle of scanning the full ion mobility range is divided into a plurality of time periods, in which an ion mobility window corresponds to a time period. The corresponding relationship is that: within a specified time period, the ions having ion mobility distributed in the corresponding ion mobility window are picked out and are continuously released to a lower device, while the ions having ion mobility distributed outside the ion mobility window are blocked or lost and cannot pass through the ion mobility spectrometer 104.

During the process of selecting different ion mobility windows in turn in a specified order, such as an order of ion mobility from small to large or from large to small, by the ion mobility filter for ion release, the full ion mobility range or the ion mobility range selected from the full ion mobility range is gradually covered until a periodic scanning event is completed. The ion mobility spectrometer 104 repeats the above scanning cycle until the analysis is completed.

In the present embodiment, within an operating cycle of scanning a full ion mobility range or a selected ion mobility range, a plurality of time periods for ion release are basically end-to-end. In some embodiments, a certain time interval may also exist between a plurality of time periods for ion release, but generally, the release process of the ion beams is basically continuous rather than releasing in pulses.

The division manner in which the full ion mobility range or a selected ion mobility range is divided into a plurality of ion mobility windows can be adjusted according to actual needs. For example, the width of each ion mobility window may be the same or not; overlap within a partial range or at a boundary point may exist between two adjacent ion mobility windows, or basically no overlap exists.

Figure 3:
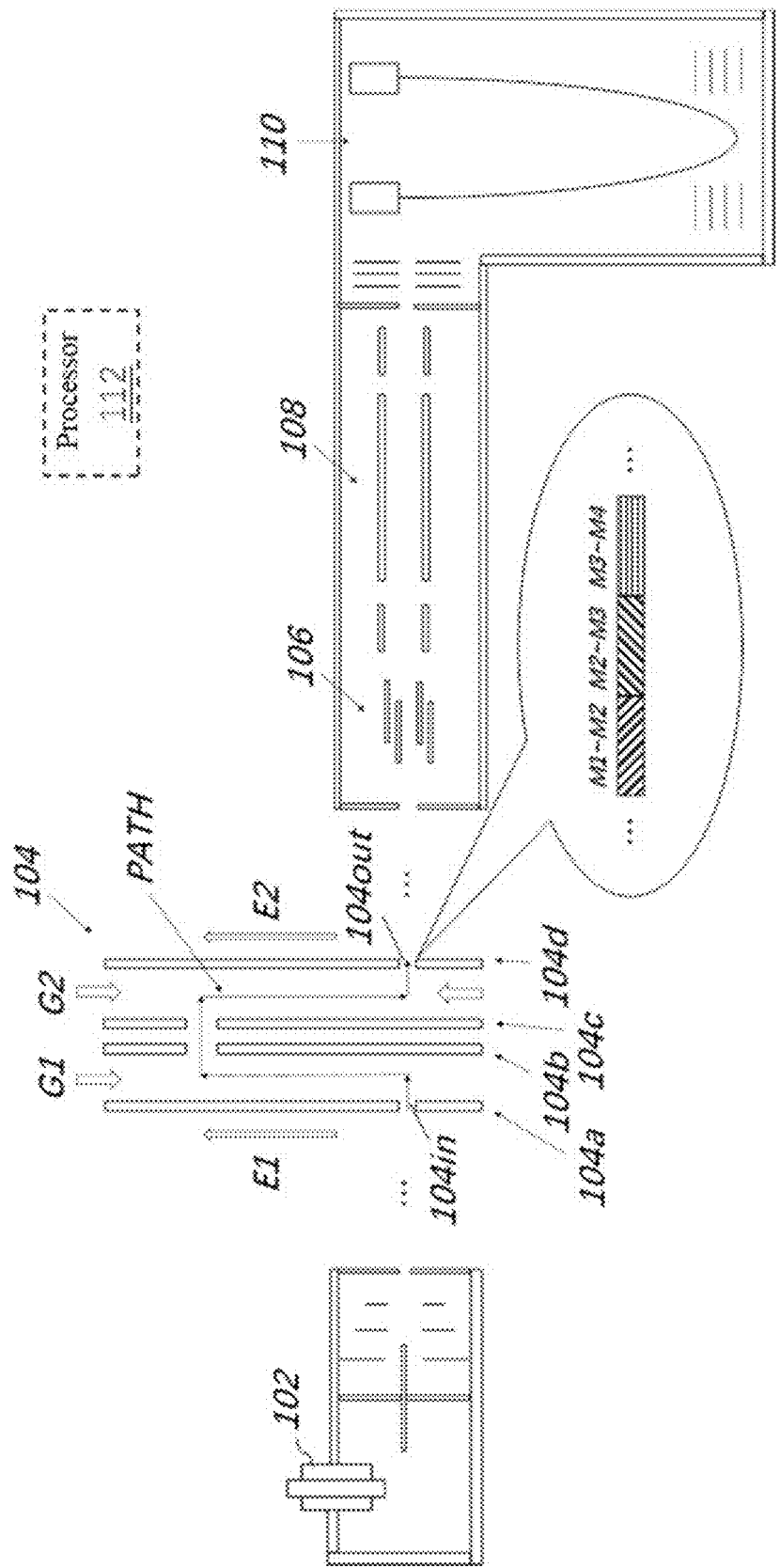
FIG. 3 is a partial structural schematic diagram of the mass spectrometry system according to the embodiment in FIG. 2.

The structure of an ion mobility spectrum system provided in this embodiment is shown in FIG. 3 (a chromatographic instrument is not shown in FIG. 3 for convenience of description), in which the ion mobility spectrometer 104 as the ion mobility filter, includes four groups of electrode arrays 104a, 104b, 104c and 104d, electrodes in each group of electrode array are arranged in the same plane, and the planes at which the four groups of electrode arrays are located are parallel to each other. Gas flow G1 exists between electrode array 104a and electrode array 104b, and gas flow G2 exists between electrode array 104c and electrode array 104d, in which the gas flow G1 and the gas flow G2 has the same direction. A direct current electric field E1 is applied between the electrode array 104a and the electrode array 104b, a direct current field E2 is applied between the electrode array 104c and the electrode array 104d, and the direction of the direct current fields E1 and E2 is opposite to that of the gas flow G1 and G2.

A detector (not shown) is provided outside an ion outlet 104out. As shown in FIG. 3, a first mobility region is formed between two parallel electrode arrays 104a and 104b, and a second mobility region is formed between two parallel electrode arrays 104c and 104d. Ends of the parallel electrode arrays 104b and 104c are in communication with each other to form a connecting region to connect the first and second mobility regions.

In the first mobility region, a linear or non-linear direct current field E1 can be applied on the electrode arrays 104a and 104b, an arrow of the direct current field E1 represents the direction of action on ions by the direct current field E1; the gas flow G1 flows through the first mobility region, and the direction of acting force applied to the ions by the gas flow G1 is opposite to that of the direct current field E1.

In addition, in the second mobility region, a linear or non-linear direct current field E2 is applied on the electrode arrays 104c and 104d, the gas flow G2 is present in the second mobility region, and the direction of acting force applied to the ions by the gas flow G2 is opposite to that of the direct current field E2. In the connection region, a direct current field (not shown) is also applied to transmit the ions from the first mobility region to the second mobility region.

Using the balance of the direct current fields E1 and E2 and the gas flows G1 and G2, the ion mobility spectrometer 104 provided in this embodiment can perform ion mobility based filtration on ions, the screened out ions that satisfy the condition, i.e., ions having ion mobility within a specified range, can move along a specified PATH (i.e., a path shown by arrows in FIG. 3 from the ion inlet 104in to the ion outlet 104out) and release to the lower device.

When the ion mobility spectrometer 104 selects ions having ion mobility within the range of M1 to M2 for release, the ions in the range of M1 to M2 maintain movement in the direction toward the ion outlet on the specified PATH without being trapped and stored in a partial region during the mobility process.

In addition, as to the ions released from the ion outlet 104out, the release between adjacent ion mobility windows is also basically end-to-end, e.g., the release between the M1 to M2 ion mobility window and the M2 to M3 ion mobility window is end-to-end, such that the release process of ions is continuous as a whole, thereby improving the utilization efficiency of ions. In the above manner, the ion mobility spectrometer 104 in this embodiment scans different ion mobility windows in an end-to-end form with continuous release, and performs release within the full ion mobility range.

Mass Spectrometry

The mass spectrometer 105 in the present embodiment may be any mass spectrometer 105 capable of providing accurate mass measurements for daughter ion peaks.

In the present embodiment, the mass spectrometer 105 connected in series with the ion mobility spectrometer 104 operating in the ion mobility filter mode includes a quadrupole mass analyzer, a collision cell, and a time-of-flight mass analyzer that are connected sequentially in series. The quadrupole mass analyzer is provided at a preceding stage of the collision cell as the first mass analyzer 106 of the mass spectrometer 105; the collision cell is provided between the quadrupole mass analyzer and the time-of-flight mass analyzer, and serves as a dissociation unit 108 to dissociate the passing ions; and the time-of-flight mass analyzer is provided at a post stage of the collision cell as a second mass analyzer 110 of the mass spectrometer.

In some embodiments, the functions of the collision cell and the second mass analyzer may also be integrated in the same mass analyzer, such as an ion trap mass analyzer. The ion trap mass analyzer can integrate various functions such as transmission, mass selection, dissociation of ions, and the like, and utilizes a simple device structure to dissociate ions with a specific mass-to-charge ratio or in a mass-to-charge ratio range from received or stored ions, so that the ions can be performed multiple tandem analyses in a time dimension to provide more detail information for structural analysis of compounds. For example, in some embodiments, a structure in which the quadrupole and the ion trap mass analyzer are connected in series may be used to perform tandem analysis.

Collision Cell

In the mass spectrometer 105 provided in this embodiment, a collision cell that can change dissociation energy is used to control the extent to which ions passing through the collision cell are dissociated. Specifically, with low dissociation energy, the ions passing through the collision cell are not dissociated or dissociated at a low degree, so that spectrum information of the parent ions can be collected at the post stage of the collision cell; when the collision cell is running with high dissociation energy, the ions passing through the collision cell can be dissociated at a higher degree, so that spectrum information of the daughter ions can be collected at the post stage of the collision cell by adjusting the dissociation energy. The collision cell is set to periodically switch between high-low dissociation energy, and can obtain the spectrum information of the parent ions and the daughter ions respectively at different time intervals within a cycle as a basis for a classification task between the parent ions and the daughter ions.

The ion dissociation device 108 may be selected from the group consisting of: (i) collision-induced dissociation ("CID") fragmentation device; (ii) surface-induced dissociation ("SID") fragmentation device; (iii) electron transfer dissociation ("ETD") fragmentation device; (iv) electron capture dissociation ("ECD") fragmentation device; (v) electron collision or impact dissociation fragmentation device; (vi) photo-induced dissociation ("PID") fragmentation device; (vii) laser-induced dissociation fragmentation device; (viii) infrared radiation induced dissociation device; (ix) ultraviolet radiation induced dissociation device; (x) nozzle-skimmer interface fragmentation device; (xi) in-source fragmentation device; (xii) in-source collision induced dissociation fragmentation device; (xiii) thermal or temperature source fragmentation device; (xiv) electric field induced fragmentation device; (xv) magnetic field induced fragmentation device; (xvi) enzymatic digestion or enzymatic degradation fragmentation device; (xvii) ion-ion reaction fragmentation device; (xviii) ion-molecule reaction fragmentation device; (xix) ion-atom reaction fragmentation device; (xx) ion-metastable ion reaction fragmentation device; (xxi) ion-metastable molecular reaction fragmentation device; (xxii) ion-metastable atom reaction fragmentation device; (xxiii) ion-ion reaction device used for reacting ions to form adducts or product ions; (xxiv) ion-molecular reaction device used for reacting ions to form adducts or product ions; (xxv) ion-atom reaction device used for reacting ions to form adducts or product ions; (xxvi) ion-metastable ion reaction device used for reacting ions to form adducts or product ions; (xxvii) ion-metastable molecular reaction device used for reacting ions to form adducts or product ions; (xxviii) ion-metastable atom reaction device used for reacting ions to form adducts or product ions; and (xxix) electron ionization dissociation ("EID") fragmentation device.

In a low dissociation mode, a voltage applied to the collision cell is reduced to adjust the dissociation energy into a relatively low value. In some embodiments, the magnitude of the voltage applied to the collision cell is selected from the group consisting of: ≤5V; ≤4.5V; ≤4V; ≤3.5V; ≤3V; ≤2.5V; ≤2V; ≤1.5V; ≤1V; ≤0.5V; or basically equal to 0V.

In a high dissociation mode, the voltage applied to the collision cell is increased to adjust the dissociation energy into a relatively high value. In some embodiments, the magnitude of the voltage applied to the collision cell is selected from the group consisting of: ≥10V; ≥15V; ≥20V; ≥30V; ≥40V; ≥50V; ≥100V; ≥150V; ≥200V.

Quadrupole Mass Analyzer

As the first mass analyzer 106 of the mass spectrometer, the quadrupole mass analyzer is used to select ions with a suitable mass-to-charge ratio value or in a mass-to-charge ratio range to enter the collision cell for dissociation.

In the present embodiment, when it is required to obtain a mass spectrum with low dissociation energy, such as a parent-ion spectrum, the collision cell can be set to work under a low dissociation energy state, and simultaneously a quadrupole mass analyzer is used for scanning within a full mass-to-charge ratio range or leading all the ions to pass into the second-level mass analyzer for mass-to-charge ratio selection, thereby obtaining the mass spectrum of the parent ions. When it is required to obtain a mass spectrum with high dissociation energy, such as a daughter-ion spectrum, the collision cell can be set to work under a high dissociation energy state, and scan the full mass-to-charge ratio range of ions to obtain multiple daughter-ion mass spectra in a manner of stepwise selecting multiple mass-to-charge ratio windows. In the present embodiment, one parent-ion spectrum and multiple daughter-ion spectra can be acquired in each operating cycle of the mass spectrometer. In other embodiments, the number of spectra collected in each operating cycle can also be flexibly selected according to actual needs, and is not limited to the above manners. The parent-ion spectrum and the daughter-ion spectrum are combined to form a mass spectrometry data set for processing by a processor 112.

Since in the data independent acquisition method, each mass-to-charge ratio window contains a plurality of parent ion peaks in most cases, and if the parent ion peaks can be clearly paired with the daughter ion peaks in the daughter-ion spectrum, mass spectrometry data containing dissociation information corresponding to the analyte can be analyzed and obtained. Then, searching and comparison is performed from the existing mass spectrometry database to identify the chemical formula, relative molecular mass, conformation, configuration and other information of the analyte.

In the present embodiment, the quadrupole mass analyzer can adjust the mass-to-charge ratio in a stepwise manner. Specifically, it is possible to sequentially select different mass-to-charge ratio windows from a plurality of mass-to-charge ratio windows formed by division in the full mass-to-charge ratio range until the full mass-to-charge ratio range is covered. The order of selecting the mass-to-charge ratio windows can be from large to small or from small to large.

For analysis tasks that mainly take small mass ions as analytes, such as metabolomics analysis, the full mass-to-charge ratio range usually corresponds to the range of mass-to-charge ratio between about 100 to 600; for analysis tasks that mainly take polypeptides as analytes, such as proteomics analysis, the full mass-to-charge ratio range usually corresponds to the range of mass-to-charge ratio between about 400 to 1400.

Mass-to-Charge Ratio Window

The selected or separated ions have mass-to-charge ratio values distributed in a specified range that is exactly the corresponding mass-to-charge ratio window. In some embodiments, each mass-to-charge ratio window may include 5 consecutive mass-to-charge ratio numbers, that is, the maximum and minimum values within the range differ by 5 mass-to-charge ratio numbers, in other words, a mass-to-charge ratio window of "+/−2.5 Dalton". The widths of the plurality of mass-to-charge ratio windows are variable or consistent within the full mass-to-charge ratio range. The plurality of mass-to-charge ratio windows may overlap partially or not overlap at all.

In the present embodiment, the ion release of the ion mobility spectrometer is synchronized with the mass analysis of the mass spectrometer. Specifically, the synchronization mode in the present embodiment is that when the ion mobility spectrometer completes ion release within a certain ion mobility or ion-gas collision cross-sectional area, the mass analyzer synchronously completes scanning within one or more mass-to-charge ratio ranges, such as parent-ion scanning within the full mass-to-charge ratio range, and daughter-ion scanning for a plurality of mass-to-charge ratio windows within the full mass-to-charge ratio range.

Time-of-Flight Mass Analyzer

The time-of-flight mass analyzer, as the second mass analyzer 110 of the mass spectrometer in the present embodiment, is mainly used for analysis of parent/daughter ions. The accelerated ions are separated in the time-of-flight mass analyzer according to dimension of mass-to-charge ratios, and reach a detector that records mass spectra of the ions. An ion mass spectrum recorded in the low dissociation mode is used as a low dissociation spectrum, for example, as a parent-ion spectrum; an ion mass spectrum recorded in the high dissociation mode is used as a high dissociation spectrum, for example, as a daughter-ion spectrum.

In some embodiments of the present invention, the first mass analyzer 106, the second mass analyzer 110 may be selected from the group consisting of: (i) quadrupole mass analyzer; (ii) 2D or linear quadrupole mass analyzer; (iii) Paul or 3D quadrupole mass analyzer; (iv) Penning trap mass analyzer; (v) ion trap mass analyzer; (vi) magnetic sector mass analyzer; (vii) ion cyclotron resonance (ICR) mass analyzer; (viii) Fourier-transform ion cyclotron resonance (FTICR) mass analyzer; (ix) electrostatic mass analyzer arranged to generate an electrostatic field having a quadro-logarithmic potential distribution; (x) Fourier-transform electrostatic mass analyzer; (xi) Fourier transform mass analyzer; (xii) time-of-flight mass analyzer; (xiii) orthogonal acceleration time-of-flight mass analyzer; and (xiv) linear acceleration time-of-flight mass analyzer.

In the present embodiment, the first mass analyzer 106 is a quadrupole mass analyzer, and in other embodiments of the present invention, the first mass analyzer 106 is preferably configured as a time-of-flight mass analyzer, a magnetic sector mass analyzer, or other suitable types of mass analyzers, as long as the first mass analyzer can continuously select ions of different mass-to-charge ratio windows to pass through so as to complete scanning of the selected mass-to-charge ratio range or the full mass-to-charge ratio range.

In the present embodiment, the second mass analyzer 110 is a time-of-flight mass analyzer, and in other embodiments, the form of the second mass analyzer is not limited thereto, e.g., it may also be preferable to adopt a quadrupole mass analyzer, a magnetic sector mass analyzer, a Fourier transform mass analyzer or any other suitable types of mass analyzers.

Control Flow

A mass spectrometry system 1 provided by the present embodiment can be applied to qualitative or quantitative analysis of metabonomics, proteomics and the like. Specifically, when analyzing an analyte in the form of a mixture, the mixed analyte can be provided with three separations in orthogonal dimensions, including separation of chromatography in the retention time dimension, separation of the ion mobility spectrum in the ion mobility dimension, and separation of mass spectrometry in the mass-to-charge ratio dimension, so that mathematical deconvolution can be performed to correspond the parent ions with the daughter ions and identify type and amount of each component in the mixed analyte by using characteristics that the parent ions and the daughter ions of the same analyte have the same elution peak shape, retention time, or ion mobility on the chromatogram and the ion mobility spectrum.

Figure 4:
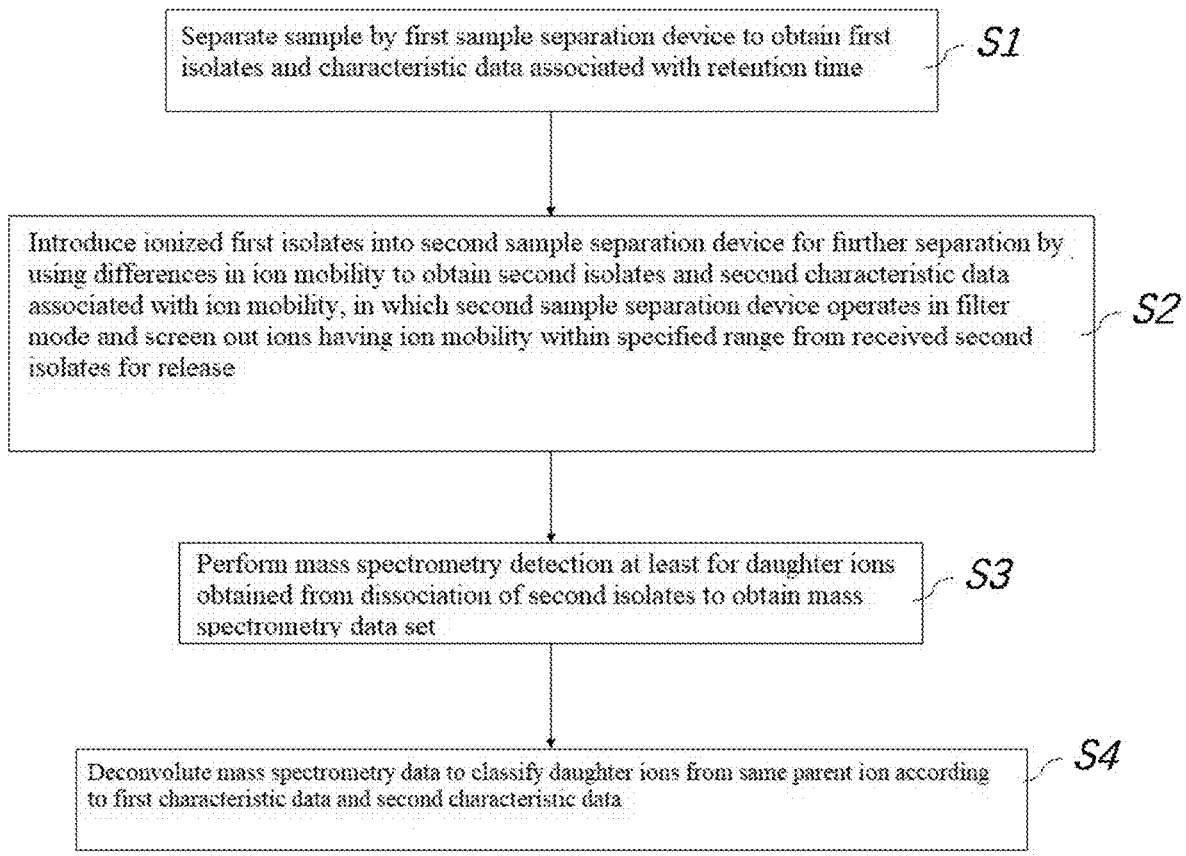
FIG. 4 is a flow chart of the mass spectrometry analysis method according to the embodiment in FIG. 2.
Figure 5:
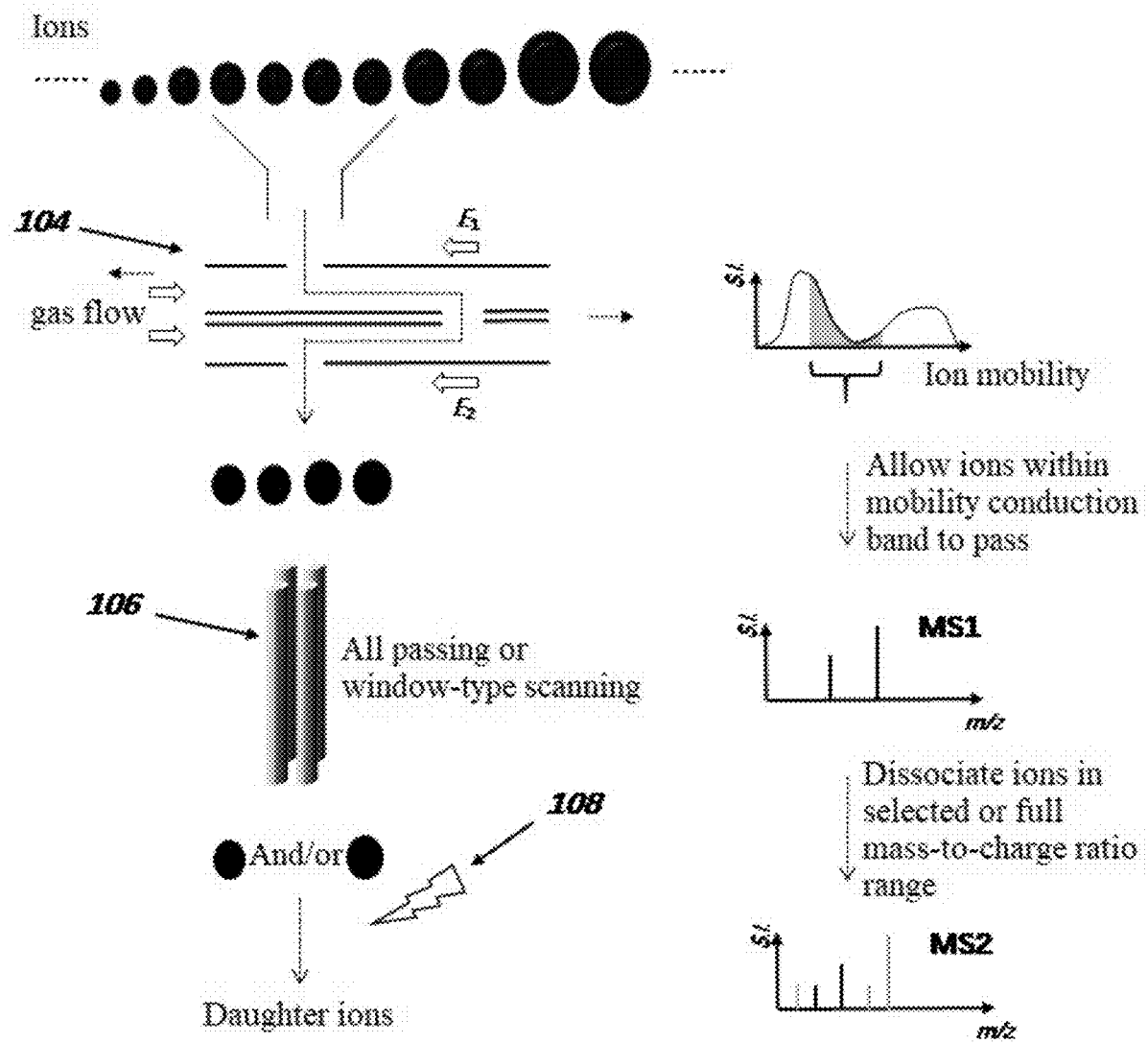
FIG. 5 is a schematic diagram illustrating a principle of mass spectrometry analysis according to the embodiment in FIG. 2.

For the control between different modules, the mass spectrometry analysis method as shown in FIGS. 4 and 5 is adopted. Specifically, as shown in FIG. 4, the mass spectrometry analysis method provided in the present embodiment includes the following steps.

S1, a first sample separation step, separating a sample by a first sample separation device to obtain first isolates and characteristic data associated with the retention time.

In this embodiment, the first sample separation device is a chromatographic instrument, and the obtained characteristic data of the separation time is characteristic data related to the retention time of each component running through a chromatographic column, such as spectrogram data of the chromatogram.

S2, a second sample separation step, introducing ionized first isolates into the second sample separation device for further separation by using differences in ion mobility to obtain second isolates and second characteristic data associated with the ion mobility.

In the present embodiment, the second sample separation device is the ion mobility spectrometer 104, and the sample is separated by the chromatographic instrument 100 and then introduced into the ion mobility spectrometer 104 for secondary separation. The ion mobility spectrometer 104 performs separation based on differences in ion mobility (or related parameters such as ion-gas collision cross-sectional area) to obtain characteristic data associated with the ion mobility, such as spectrum data of the ion mobility spectrum.

It should be noted that the process of ionizing the sample is not limited to occur after the first sample separation step S1, but can also occur before the first sample separation step S1, in other words, the technical solution of ionization before the first sample separation step S1 should also be included within the scope of the present invention if not departing from the spirit of the present invention.

In this embodiment, in the second sample separation step S2, the second sample separation device operates in a filter mode, and screens out and releases ions having ion mobility within the specified range from received second isolates.

In an existing chromatogram-ion mobility spectrum-mass spectrometry system, the ion mobility spectrometer operates in a discontinuous mode, i.e., the ions are in the form of pulses, and ions are released at a regular interval (interval time may not be the same) at outlet ends of the ions. Thus, during operation of the ion mobility spectrum, the outlet end of the ion mobility spectrum is basically free of released ions during some time periods (occupying about 30%, 50% or more than 70% of the total operating time of the ion mobility spectrum). During these time periods (interval time) when no ions are released, the unreleased ions will be gradually accumulated in the ion storage device or region of the ion mobility spectrometer.

In the accumulation process, the degree of enrichment of high-abundance ions (having a relatively high percentage content in an accumulation region of ions) rises to an extent of breaking through the detection limit of the detector, leading to a rise in the high-abundance ion concentration that is unable to continue to linearly enhance the signal strength of the detector, and thus the quantitative accuracy thereof and dynamic range of measurement results are affected. At the same time, the enrichment of ions within the ion storage device causes a portion of low-abundance ions (having a relatively low percentage content in an accumulation region of ions) to be pushed away from the accumulation region for storing ions due to the space charge effect of the ion storage device, thereby lowering concentration measurement results of the low-abundance ions and also affecting the quantitative accuracy thereof and dynamic range of measurement results.

Unlike the structure and operation method of an existing chromatogram-ion mobility spectrum-mass spectrometer operating in a discontinuous mode, the chromatogram-ion mobility spectrum-mass spectrometer in the present embodiment can remove the ion storage device in the ion mobility spectrum to replace the ion mobility spectrometer operating in a filter mode.

Further, the second sample separation step S2 includes an ion introduction step, an ion separation step, and an ion extraction step, in which ions in the selected ion mobility range can continuously pass through the second sample separation device at any time in the ion separation step, and ions outside the selected ion mobility range cannot pass through the second sample separation device.

In this embodiment, since the ion mobility spectrometer 104 is operating in the filter mode, an ion transmission process from the ion inlet of the ion mobility spectrometer to the ion outlet of the ion mobility spectrometer is a relatively continuous motion process during which operation for the ions mainly focuses on screening according to ion mobility, that is, ions that meet the condition of ion mobility are preserved, while ions that does not meet the condition of ion mobility are removed. In the screening process described above, an operation method of the ion mobility spectrometer for the preserved ions is a process of transport according to a specified path and re-acceleration after being trapped without cooling, so that motion velocities of the ions in the transport direction is basically stable and less likely to be trapped within a particular region, and the overall distribution of ions within the ion mobility spectrometer is relatively even and less enriched in the partial region, thereby improving the dynamic range of measurement results and quantitative accuracy.

Specifically, in the second sample separation step S2, the second sample separation device continuously selects ions of different windows within the full ion mobility or ion-gas collision cross-sectional area to release to the subsequent mass spectrometry, and scans a parameter range of the full ion mobility or the ion-gas collision cross-sectional area in a specified order.

S3, mass spectrometry analysis step, performing mass spectrometry detection at least for the daughter ions obtained from the dissociation of the second isolates to obtain a mass spectrometry data set.

Dissociation for the eluted sample ions after processing in the S2 step is performed, and mass spectrometry detection for the daughter ions obtained after dissociation is carried out. It should be noted that in the S3 mass spectrometry analysis step, the mass spectrometer 105 implements mass spectrometry detection for the dissociated daughter ions, but does not limited to mass spectrometry detection only for the daughter ions. In some embodiments, mass spectrometry analysis for undissociated parent ions or parent ions with a low dissociation degree may also be performed as desired.

In the present embodiment, in the mass spectrometry analysis step, the analysis of the parent ion is performed by the cooperation between the first mass analyzer 106 and the second mass analyzer 110 that are provided in the mass spectrometer 105, and the ion dissociation device 108 is provided between the first mass analyzer 106 and the second mass analyzer 110, in which the first mass analyzer 106 is used to select ions in a full mass-to-charge ratio range or a partial mass-to-charge ratio range to pass into the ion dissociation device 108, and the second mass analyzer 110 acquires mass spectrometry data of the daughter ions generated by the ion dissociation device 108.

When the first mass analyzer 106 selects the ions in the full mass-to-charge ratio range to pass into the ion dissociation device 108 and the ion dissociation device 108 closes the applied dissociation energy, the mass spectrometer 105 records the mass spectrum of the parent ion, i.e., a primary spectrum MS1.

In some embodiments, mass spectrometry data can be acquired by data dependent acquisition, that is, selecting ions that meet a preset condition from the primary spectrum MS1 according to the primary spectrum MS1 and the preset condition, releasing the ions into the ion dissociation device 108 for dissociation, detecting and obtaining a plurality of daughter-ion mass spectrum MS2, and forming a mass spectrometry data set containing MS1 and MS2 data.

In the present embodiment, mass spectrometry data is acquired by data independent acquisition method, that is, scanning the full mass-to-charge ratio range in a mass-to-charge ratio window of a specified width, introducing the parent ions in each mass-to-charge ratio window into the ion dissociation device 108 for dissociation, detecting and obtaining a plurality of daughter-ion mass spectrum MS2, and forming a mass spectrometry data set containing MS1 and MS2 data.

In other embodiments of the present invention, the ion trap mass analyzer can also be used to collect parent-ion mass spectrometry data and daughter-ion mass spectrometry data obtained by tandem mass spectrometry analysis, in which the tandem mass spectrometry analysis is repeated multiple times continuously. The ion trap mass analyzer can integrate various functions such as transmission, mass selection, dissociation of ions, and the like, and utilizes a simple device to dissociate ions with a specific mass-to-charge ratio or in a mass-to-charge ratio range from received or stored ions, so that the ions can be performed multiple tandem analyses in a time dimension to provide more detail information for structural analysis of compounds. According to a sample transport path, the S1, S2, and S3 steps are performed on samples mixed with multiple components, thereby completing the separation and data recording processes of the sample synchronously during the analysis. In some embodiments, another separation step can be performed multiple times during an execution cycle of one type of separation step due to the fact that execution frequencies of the periodically repeated S1, S2, and S3 steps are not the same. For example, in the execution cycle of the S1 step, the S2 step can be performed multiple times, in other words, ion mobility spectrum separation can be performed several times and multiple ion mobility spectra are recorded in the process of performing chromatographic separation and recording a chromatogram, and mass spectrometric separation can be performed several times and multiple mass spectra can be recorded in the process of performing ion mobility spectrum separation and recording an ion mobility spectrum. Of course, the above description is merely exemplary, and is not intended to strictly limit cycle time relationships among separation methods.

S4, data processing step, deconvoluting the mass spectrometry data to classify the daughter ions from the same parent ion according to the first characteristic data and the second characteristic data.

Commonly used algorithms for deconvolution include Pearson's correlation coefficient, cross correlation score, k-means clustering, minimum entropy algorithm, dot product scoring algorithm, minimum spanning tree algorithm, and the like, which are well known to those skilled in the art and are not repeated herein.

In the above manner, each component in the sample is separated in three orthogonal dimensions according to the retention time of the component or the corresponding ion, the ion mobility, and the mass-to-charge ratio of parent/daughter ion. The increased separation dimension can further improve the accuracy of the deconvolution process, and guarantee the quantitative ability of a data independent acquisition process. In addition, the increased ion mobility separation dimension can also select ions of a specified type or in a charged state (e.g., charge number) from the ions for more targeted analysis by using synchronous operation with the mass spectrometer, thereby maintaining a higher quantitative ability.

The above are only preferred embodiments of the present invention and are not intended to limit the present invention. Any modification, equivalent substitution, improvement or the like within the spirit and principle of the invention should be included in the scope of the present invention.

What is claimed is:

1. A mass spectrometry analysis method, comprising the steps of:
 a first sample separation step, separating a sample by a first sample separation device to obtain first isolates;
 a second sample separation step, introducing ionized first isolates into a second sample separation device for further separation by using differences in ion mobility to obtain second isolates;
 a dissociation step, performing dissociation on at least some of the second isolates to obtain daughter ions; and
 a mass spectrometry analysis step, performing mass spectrometry detection at least for the daughter ions obtained from the dissociation of the second isolates,
 wherein in the second sample separation step, the second sample separation device operates in a filter mode, and screens out from the ionized first isolates during a first time period, first ions having ion mobility within a first ion mobility window to obtain second isolates, the first ion mobility window being a first specified range of ion mobility; and
 wherein in the second sample separation step, within the first time period, the first ions having an ion mobility within the first ion mobility window are screened out based on a balance of first electric fields and first gas flows and are continuously released from an ion outlet of the second sample separation device to a lower device,
 wherein, during the first time period, the first ions continuously move toward the ion outlet along a drift path within the second sample separation device from an ion inlet of the second sample separation device to the ion outlet,
 wherein, during the first time period, ions having an ion mobility outside the first ion mobility window are separated from the first ions and are prevented from exiting the second sample separation device via the ion outlet solely by the balance of the first electric fields and the first gas so that they are not transmitted to the lower device, and
 wherein, during the first time period, the ions having an ion mobility outside the first ion mobility window exit the second sample separation device via one or more ports of the second sample separation device other than the ion outlet.

2. The mass spectrometry analysis method according to claim 1, wherein in the second sample separation step, when the second sample separation device selects the ions having ion mobility within a specified range for release, the ions within the specified range are kept moving along the drift path direction from the ion inlet to the ion outlet.

3. The mass spectrometry analysis method according to claim 1, wherein in the second sample separation step, the second sample separation device sequentially screens out ions of different ion mobility windows to release to the lower level.

4. The mass spectrometry analysis method according to claim 1, wherein the mass spectrometry analysis step further includes mass spectrometry analysis for parent ions.

5. The mass spectrometry analysis method according to claim 4,
 wherein the mass spectrometry analysis step further includes collecting mass spectrometry data of the parent ions and mass spectrometry data of the daughter ions by using an ion trap mass analyzer, wherein the collection of the mass spectrometry data of the daughter ions is repeated several times in succession.

6. The mass spectrometry analysis method according to claim 4, wherein in the mass spectrometry analysis step,
 a first mass analyzer and a second mass analyzer are provided in the mass spectrometer, and at least one ion dissociation device is provided between the first mass analyzer and the second mass analyzer;
 in the mass spectrometer, the first mass analyzer is used to select ions within the specified mass-to-charge ratio range to pass into the ion dissociation device; and
 the second mass analyzer is used to collect mass spectrometry data of daughter ions generated by the ion dissociation device.

7. The mass spectrometry analysis method according to claim 6, wherein the mass-to-charge ratio range is defined as a plurality of mass-to-charge ratio windows dividing the full mass-to-charge ratio range.

8. The mass spectrometry analysis method according to claim 7, wherein each mass-to-charge ratio window includes at least 5 consecutive numbers of mass-to-charge ratios.

9. The mass spectrometry analysis method according to claim 7, wherein the widths of the plurality of mass-to-charge ratio windows are variable.

10. The mass spectrometry analysis method according to claim 7, wherein the first mass analyzer completes one scanning of the full mass-to-charge ratio range during the time period when the second sample separation device completes the release of the first ions within the first ion mobility window.

11. The mass spectrometry analysis method according to claim 4, wherein in the mass spectrometry analysis step, one or more parent ions are selected according to preset conditions and spectrum information of parent ions, and are dissociated into daughter ions for mass spectrometry analysis.

12. A mass spectrometry system, comprising:
 a first sample separation device used to separate a sample to obtain first isolates;
 a second sample separation device used to further separate the first isolates in an ionized state by using differences in ion mobility to obtain second isolates; and
 a mass spectrometer used to perform mass spectrometry detection at least for daughter ions obtained from dissociation of the second isolates,
 wherein the second sample separation device works in a filter mode, and screens out from the ionized first isolates during a first time period, first ions having ion mobility within a first ion mobility window to obtain second isolates, the first ion mobility window being a first specified range of ion mobility,
 wherein the second sample separation device is configured such that, within the first time period, the first ions having the ion mobility within the first ion mobility window are screened out based on a balance of first electric fields and first gas flows and are continuously released from an ion outlet of the second sample separation device to a lower device, while the ions having an ion mobility outside the first ion mobility window are separated from the first ions and are prevented from exiting the second sample separation device via the ion outlet solely by the balance of the first electric fields and the first gas so that they are not transmitted to the lower device, and
 wherein, during the first time period, the ions having an ion mobility outside the first ion mobility window exit the second sample separation device via one or more ports of the second sample separation device other than the ion outlet.

13. The mass spectrometry system according to claim 12, wherein the ions within the specified range are kept moving along a drift path direction from an ion inlet of the second sample separation device to the ion outlet of the sample separation device when the second sample separation device selects ions having the first ion mobility window.

14. The mass spectrometry system according to claim 12, wherein the first sample separation device is selected from one or more multiplex or combination devices among a liquid chromatographic instrument, a high performance liquid chromatographic instrument, an ultra high performance liquid chromatographic instrument, a gas chromatographic instrument, a supercritical fluid chromatographic instrument, a capillary electrophoresis instrument, and a gel permeation chromatographic instrument.

15. The mass spectrometry system according to claim 12, wherein the mass spectrometer includes an ion trap mass analyzer used to collect mass spectrometry data of parent ions and mass spectrometry data of the daughter ions.

16. The mass spectrometry system according to claim 12,
wherein the mass spectrometer includes a first mass analyzer, an ion dissociation device, and a second mass analyzer that are sequentially connected in series,
wherein the first mass analyzer is used to select ions within the specified mass-to-charge ratio range to pass into the ion dissociation device, and
wherein the second mass analyzer is used to collect mass spectrometry data of daughter ions generated by the ion dissociation device.

17. The mass spectrometry system according to claim 16, wherein the first mass analyzer is a quadrupole mass analyzer, a time-of-flight mass analyzer, or a magnetic sector mass analyzer.

18. The mass spectrometry system according to claim 16, wherein the ion dissociation device is one or a combination among a collision-induced dissociation device, an ultraviolet-induced dissociation device, an electron capture dissociation device, an electron transfer dissociation device, and a surface-induced dissociation device.

19. The mass spectrometry system according to claim 16, wherein the second mass analyzer is a quadrupole mass analyzer, a time-of-flight mass analyzer, a magnetic sector mass analyzer, or a Fourier transform mass analyzer.

20. The method of claim 1, wherein, during the first time period, the first ions moving along the drift path maintain a first speed on the drift path.

21. The method of claim 1, wherein, during the first time period, the first ions maintain movement in the direction toward the ion outlet without being stored or trapped in a region of the second sample separation device.

22. The method of claim 1, wherein the drift path of the second sample separation device comprises a first mobility region and a second mobility region, the first mobility region having a first gas flow and a first electric field exerting opposite forces to ions in the first mobility region, the second mobility region having a second gas flow and a second electric field exerting opposite forces to ions in the second mobility region.

23. The method of claim 22, wherein the drift path is "U" shaped.

24. The method of claim 23, wherein the first mobility region and the second mobility region form linear portions of the drift path, are arranged side by side in a first direction and extend in a second direction.

25. The method of claim 24, wherein ionized first isolates enter the first mobility region at a first side of the first mobility region, the first ions exit the second mobility region at a first side of the second mobility region, and the first mobility region and the second mobility region are connected at second sides of the first mobility region and the second mobility region.

26. The method of claim 22, wherein the first gas flow and the second gas flow are in the same direction.

27. The method of claim 22, wherein the first electric field and the second electric field extend in the same direction respectively in the first mobility region and the second mobility region.

28. The method of claim 27, wherein the first gas flow and the second gas flow are in the same direction.

29. The method of claim 1, wherein in the second sample separation step:
throughout the first time period, the first ions are continuously released to the lower device,
throughout a second time period after the first time period, the second sample separation device screens out from the ionized first isolates, based on a balance of second electric fields and second gas flows, second ions having ion mobility within a second ion mobility window to obtain the second isolates, the second ion mobility window being a second specified range of ion mobility different from the first specified range of ion mobility, and the second ions being continuously released to the lower device throughout the second time period, and
throughout the second time period, ions having an ion mobility outside the second ion mobility window are separated from the second ions and are prevented from exiting the second sample separation device via the ion outlet solely by the balance of the second electric fields and the second gas flows so that they are not transmitted to the lower device.

30. The method of claim 1, wherein, throughout the first time period, ions having the ion mobility outside the first ion mobility window are prevented from exiting the second sample separation device via the ion outlet without ion gating.

31. The mass spectrometry system according to claim 12, wherein, during the first time period, the first ions maintain movement in the direction toward the ion outlet without being stored or trapped in a region of the second sample separation device.

32. The mass spectrometry system according to claim 12, wherein, throughout the first time period, ions having the ion mobility outside the first ion mobility window are prevented from exiting the second sample separation device via the ion outlet without ion gating.

* * * * *